(12) United States Patent
Court et al.

(10) Patent No.: US 8,869,595 B2
(45) Date of Patent: Oct. 28, 2014

(54) ADHESIVE ASSEMBLY AND ASSEMBLY AND REINFORCEMENT METHODS COMPRISING THE USE THEREOF

(75) Inventors: Jean-Philippe Court, Paris (FR); René-Louis Geffroy, Pluzunet (FR)

(73) Assignee: Cold Pad, Paris (FR)

( * ) Notice: Subject to any disclaimer, the term of this patent is extended or adjusted under 35 U.S.C. 154(b) by 244 days.

(21) Appl. No.: 13/376,888

(22) PCT Filed: Jun. 18, 2010

(86) PCT No.: PCT/FR2010/051238
§ 371 (c)(1),
(2), (4) Date: Dec. 8, 2011

(87) PCT Pub. No.: WO2010/146321
PCT Pub. Date: Dec. 23, 2010

(65) Prior Publication Data
US 2012/0096926 A1    Apr. 26, 2012

(30) Foreign Application Priority Data

Jun. 19, 2009  (FR) ..................... 09 54204

(51) Int. Cl.
| | |
|---|---|
| G01N 19/10 | (2006.01) |
| B32B 1/06 | (2006.01) |
| B32B 38/10 | (2006.01) |
| B29C 65/54 | (2006.01) |
| B32B 37/12 | (2006.01) |
| B32B 37/14 | (2006.01) |
| F16L 13/10 | (2006.01) |
| F16B 11/00 | (2006.01) |

(52) U.S. Cl.
CPC ............. *F16L 13/103* (2013.01); *F16B 11/006* (2013.01)
USPC ............ 73/29.02; 156/60; 156/153; 156/285; 156/305; 428/76

(58) Field of Classification Search
USPC ........................................ 73/29.02
See application file for complete search history.

(56) References Cited

U.S. PATENT DOCUMENTS

2007/0262470 A1 * 11/2007 Ichiryu et al. ................. 257/783

FOREIGN PATENT DOCUMENTS

| | | |
|---|---|---|
| DE | 195 20 065 A1 | 12/1996 |
| DE | 101 21 086 A1 | 12/2002 |
| DE | 10121086 A1 * | 12/2002 |
| EP | 1 536 148 A1 | 6/2005 |
| GB | 1 315 373 A | 5/1973 |
| WO | WO 02/096607 A1 | 12/2002 |

* cited by examiner

*Primary Examiner* — Hezron E Williams
*Assistant Examiner* — Gregory J Redmann
(74) *Attorney, Agent, or Firm* — Drinker Biddle & Reath LLP

(57) ABSTRACT

An adhesive assembly is provided in particular for assembling a novel element on a structure or further for reinforcing a structure. The adhesive assembly includes a substrate, a rigid element placed with an interval relative to the substrate, at least one seal compressed between the substrate and the rigid element and defining a sealed space within said interval, and a hardened adhesive occupying said space. The seal is compressed by the rigid element that is held on the substrate by the hardened adhesive.

22 Claims, 3 Drawing Sheets

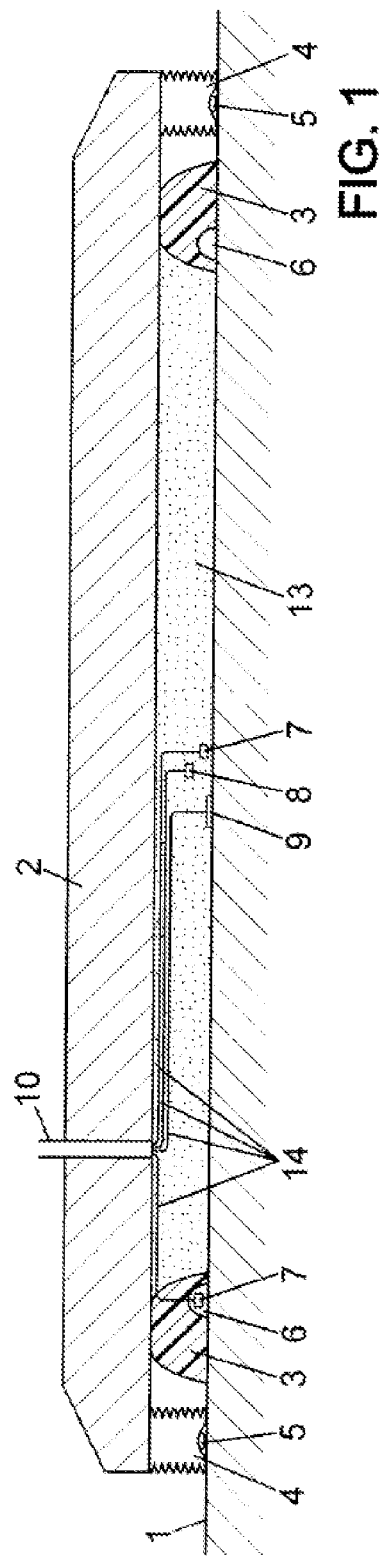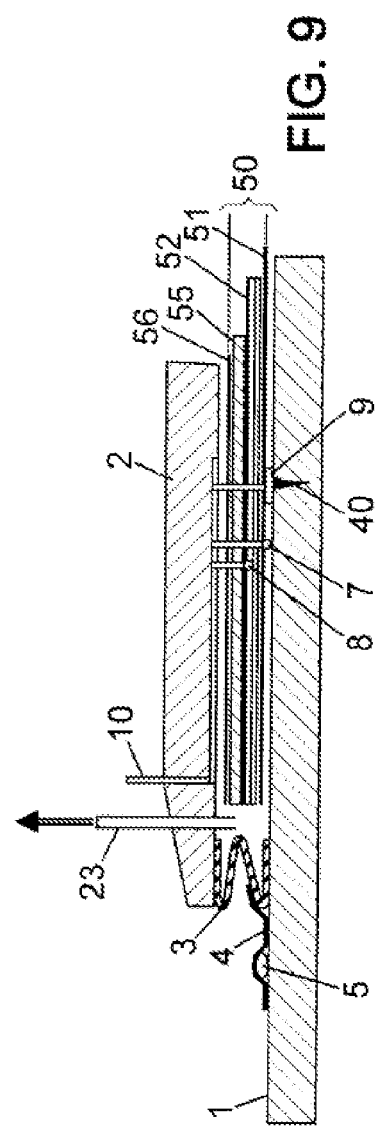

ADHESIVE ASSEMBLY AND ASSEMBLY AND REINFORCEMENT METHODS COMPRISING THE USE THEREOF

CROSS-REFERENCE TO RELATED APPLICATIONS

This application is the U.S. national phase of the International Patent Application No. PCT/FR2010/051238 filed Jun. 18, 2010, which claims the benefit of French Application No. 09 54204 filed Jun. 19, 2009, the entire content of which is incorporated herein by reference.

FIELD OF THE INVENTION

The present invention relates to techniques for producing adhesive assemblies.

BACKGROUND

It has applications in a wide variety of fields, including connecting an element to a substrate, in particular a substrate on which no attachment element was initially provided, or further reinforcing structures that need to be made stronger in order to repair or prevent the appearance of structural defects.

Metal elements are often assembled on a metal substrate by welding. This technique requires a large temperature increase, which is propagated due to the thermal conductivity of the metal substrate. It is sometimes prohibited due to environmental incompatibilities, for example if there is a flammable atmosphere near the assembly zone. Its implementation can also be problematic if the structure comprising the substrate has paint or other coatings that deteriorate at high temperatures, as the welding of the element then leads to the need to reapply the paint or coating, which can be time-consuming and costly.

For these reasons, welding techniques pose serious problems on offshore platforms or ships or pipelines carrying hydrocarbons or other flammable substances. They are commonly used but have the drawback of requiring a suspension of operation that can vary in length, together with sometimes restrictive measures to ensure the required level of safety. Welding techniques are also very difficult to implement under water or in the tidal zone.

Another solution is to bond the element to the substrate by means of a thermosetting or thermoplastic adhesive. A difficulty in this case is to guarantee that the desired properties of the adhesive are obtained. Generally, suppliers characterise the properties of the adhesives when they are implemented under well-controlled conditions, particularly in terms of temperature, degree of humidity, etc. These conditions are not necessarily all present in practice, particularly during operations in a marine environment. Furthermore, it is extremely difficult to guarantee the durability of the adhesive if the environment is relatively aggressive, which is also unfavourable to operations in a marine environment.

Structures are sometimes strengthened by applying a metal or composite reinforcement to the structure. However, similar problems to those set out above arise if an element is bonded to a substrate. In the case of a metal type reinforcement, it is connected to the structure by means of an adhesive, such as a resin. The composite material usually comprises a resin that acts as an adhesive in particular, and it is difficult to guarantee its satisfactory performance if it is applied in poorly-controlled conditions. The composite material can deteriorate over time if the reinforcement is in an aggressive environment. The same applies to the adhesive if a metal reinforcement is used. The reinforcement imparted to the structure is not therefore durable.

SUMMARY

The present invention aims to overcome some of the limitations of the aforementioned techniques and particularly aims to provide an adhesive assembly that is reliable and durable, even if the environment is potentially aggressive.

An adhesive assembly is therefore proposed, including:
  a substrate;
  a rigid element arranged with an interval relative to the substrate;
  at least one seal compressed between the substrate and the rigid element and defining a sealed space within said interval; and
  a hardened adhesive occupying said space, the seal being compressed by the rigid element that is held on the substrate by the hardened adhesive.

The adhesive contained in the sealed space between the seal, the substrate and the rigid element is advantageously isolated from the environment surrounding the adhesive assembly. The seal makes such isolation possible both during the production of the assembly, so that the implementation conditions and therefore the properties of the adhesive can be controlled, and during the subsequent use of the assembly, which therefore has satisfactory durability. The adhesive can then be chosen depending on the desired properties, with confidence that these properties will be obtained effectively and durably.

According to a second aspect, the invention proposes a method for assembling a rigid element on a substrate. This method includes the following steps:
  /a/ placing a rigid element relative to the substrate, at least one permanent seal being arranged between the rigid element and the substrate in such a way as to define a space in an interval between the rigid element and the substrate;
  /b/ bringing the rigid element and the substrate together in such a way as to compress the permanent seal and seal said space; and
  /c/ hardening an adhesive in the sealed space.

In another application of an adhesive assembly according to the invention, a method of reinforcing a structure is proposed including the following steps:
  /a/ placing a rigid element opposite a substrate forming part of said structure, at least one permanent seal being arranged between the rigid element and the substrate in such a way as to define a space in an interval between the rigid element and the substrate;
  /b/ bringing the rigid element and the substrate together in such a way as to compress the permanent seal and seal said space; and
  /c/ hardening an adhesive in the sealed space to form a composite reinforcement that is isolated from the outside by the permanent seal, which is kept compressed by the rigid element.

BRIEF DESCRIPTION OF THE DRAWINGS

Further characteristics and advantages of the present invention will become apparent from the following description of non-limitative examples of embodiment, with reference to the attached drawings, in which:

FIG. 1 is a diagrammatical view of an embodiment of an adhesive assembly according to the invention;

FIG. 9 is a diagrammatical view of another embodiment of an adhesive assembly according to the invention.

DETAILED DESCRIPTION

Figure 5:
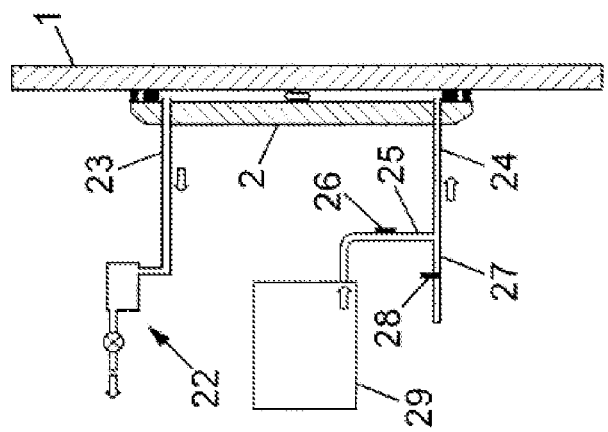
FIGS. 2 to 8 are diagrammatical representations of successive steps of an example method.

In the various figures, the same reference denotes identical or similar components.

With reference to FIG. 1, an adhesive assembly according to the invention includes a substrate 1 and a rigid element 2 which, in the example shown, is in the form of a plate covering part of the substrate. A permanent seal 3 is compressed between the rigid plate 2 and the substrate 1. The seal 3 defines a space occupied by a hardened adhesive 13 in the interval between the plate 2 and the substrate 1.

An installation seal 4 can optionally be arranged between the plate 2 and the substrate 1, around the permanent seal 3. The installation seal 4 is more flexible than the permanent seal 3. Its role will be explained below.

The hardened adhesive 13 maintains the gap between the rigid element 2 and the substrate 1, so that the rigid element 2 permanently applies compressive force to the seal 3. The seal 3 compressed in this way seals the space occupied by the adhesive 13 from the external environment, which protects it from the aggressive nature of the external environment. By "rigid element" 2 is meant an element, in the form of a plate or otherwise, that is sufficiently rigid to transmit compressive force to the peripheral seal 3 when the central region of the element 2 is forced towards the substrate 1. The contact surface between the hardened adhesive 13 and the seal 3 also contributes to holding the seal 3.

The rigid element 2 is typically made from metal, a composite material or any other material that is sufficiently rigid and resistant to the environment in which the assembly will be used. The permanent seal 3 is made from a material, such as an elastomer, chosen for its resistance to this environment. For example, in a marine environment, an EPDM or Viton® type elastomer can be used for the seal 3.

In one embodiment, the adhesive assembly can comprise one or more sensors 7-9 located in the interval between the rigid element 2 and the substrate 1. Such sensors are used to detect physical parameters inside the interval, such as for example:

the temperature, which can in particular be measured by a thermocouple 8;
the moisture content, which can be measured by a humidity sensor 7; and
the deformation, which can be measured by a stress gauge 9, preferably placed on the substrate 1.

The measuring signals coming from the sensor or sensors 7-9 are conveyed out of the adhesive assembly by links 14 that pass through the rigid plate 2 in a connection bundle 10 incorporated in a sealed manner in the plate 2. These signals can thus be used to assess mainly the installation conditions of the adhesive assembly, but also to assess the ageing conditions of the hardened adhesive 13, ensure that it is performing satisfactorily over time and identify any need to repair the assembly.

In particular, it can be desirable to check the tightness of the space occupied by the hardened adhesive 13 between the substrate 1 and the plate 2 over time. To this end, a humidity sensor 7 can be placed in contact with a hydrophilic element 6 placed to sense any moisture that might enter the space occupied by the hardened adhesive 13. In the embodiment shown in FIG. 1, the hydrophilic element 6 is inserted in an annular groove made in the permanent seal 3, in order to sense any moisture entering along the substrate 1 towards the adhesive.

The adhesive used is typically a thermosetting resin, for example of the EPONAL® or ARALDITE® type. Reinforcing fibres and/or fills can be added to its composition. The presence of fibres in the hardened adhesive 13 increases its resistance to mechanical stresses.

If the adhesive is injected into the space defined by the seal in the interval between the substrate 1 and the plate 2, the fibres coated by the adhesive can be short fibres mixed with the injected adhesive. The orientation of the short fibres is therefore random in the hardened adhesive 13, which gives it substantially isotropic mechanical properties.

The fibres can also be long fibres from a fibre mat or fabric placed between the substrate 1 and the plate 2 during installation. The use of long fibres means that the majority of them can be oriented in one or more directions if the application being made of the assembly requires greater strength on the part of the hardened adhesive 13 in such directions.

In another embodiment, long fibres can be placed in the interval between the substrate 1 and the plate 2 by using a prepreg, that is, a group of fibres impregnated with a resin kept at a low temperature to delay setting. During installation of the plate 2, the prepreg is placed in the interval and then the resin hardens when the temperature rises.

The permanent seal 3 plays an important role when the adhesive assembly is used after installation. Compressed by the rigid plate 2, it protects the adhesive 13 from the external environment, which results in better durability conditions.

The role of the seal 3 is also important during the installation of the assembly. During installation, the rigid plate 2 is forced towards the substrate 1, either by means of negative pressure in the space defined by the seal, or by the application of force on the back of the plate 2. This force compresses the seal 3, thus sealing the space that will be occupied by the hardened adhesive. The sealed space makes it possible to produce physical conditions within it, particularly in terms of temperature, pressure and humidity, that are suitable for the implementation of the adhesive. Implementation can also take place as recommended by the adhesive supplier. The desired performance of the assembly is thus obtained, even if it is produced in a difficult environment, such as a marine environment for example.

An installation method for an adhesive assembly according to the invention is shown in FIGS. 2 to 8. In this example, a rigid element 2 in the form of a plate is being assembled on a substrate 1. With a view to enabling the mounting of other elements on the substrate, the plate 2 can be equipped with connection systems such as forks, anchor rods, bolts or threading, etc., not shown on the drawings. The substrate 1 can be metal, for example part of the deck or hull of a ship or an offshore platform.

Figure 3:
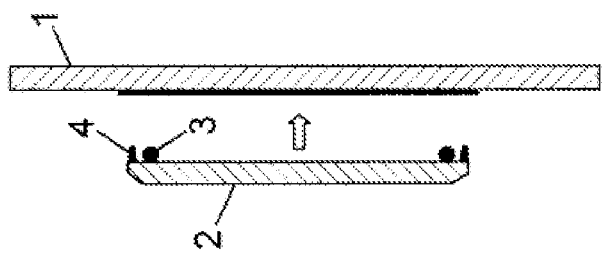
Figure 2:
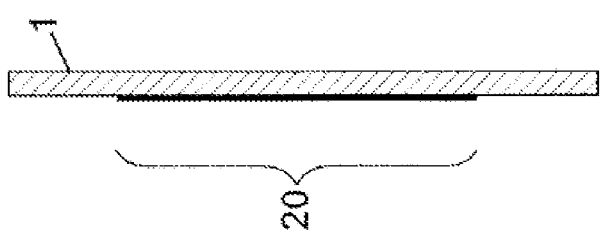

In a first (optional) step shown in FIG. 2, the substrate is cleaned in the zone 20 that will be covered by the rigid plate 2, by means of solvents and/or abrasives. The plate 2, on which the permanent seal 3 and the installation seal 4 have been positioned, can then be presented (FIG. 3). The seals 3, 4 extend the length of the periphery of the plate 2, the installation seal 4 being more flexible than the permanent seal 3 and placed outside it. The installation seal 4 can be thicker than the permanent seal 3, perpendicularly to the plate 2, so that it comes into contact with the substrate 1 first. If sensors and/or a hydrophilic element 6 (not shown in FIGS. 2 to 8) are to be installed in the interval between the substrate 1 and the rigid plate 2, they can be put in place by being preinstalled on the plate 2 presented opposite the substrate 1.

Figure 4:
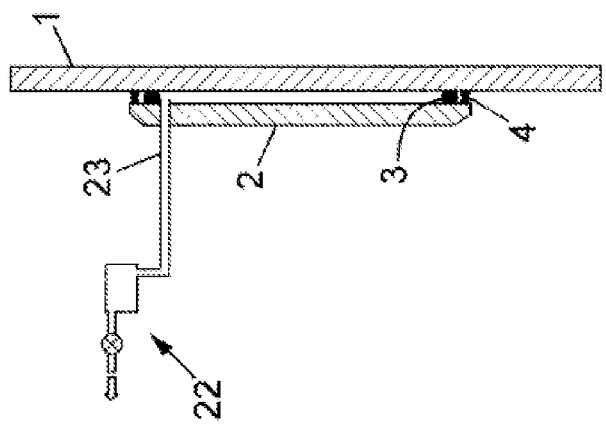

Once contact has been made, a pumping system 22 is activated to create negative pressure in the interval between the substrate 1 and the plate 2 through a duct 23 made in the plate 2 inside the permanent seal 3 (FIG. 4). The negative pressure forces the plate 2 towards the substrate 1 and compresses the seals 3, 4. In the initial pumping phase, it is possible that the stiffness of the permanent seal 3 will prevent it from providing a good seal due to any surface roughnesses of the substrate 1. The installation seal 4, which is compressed first, provides this initial seal. When the negative pressure becomes sufficient, the permanent seal is also squeezed between the substrate 1 and the plate 2 and provides the desired seal.

Next, a second duct 24, provided in the plate 2, is used to introduce treatment fluids into the space sealed by the seal 3, in which negative pressure is maintained by the duct (FIG. 5). In the example shown, the duct 24 is connected to two other ducts 25, 27 that can be opened or closed selectively by respective valves 26, 28. In the phase shown in FIG. 5, the duct 25 is connected, by opening the valve 26, with one or more tanks 29 containing the desired treatment fluids, while the valve 28 is closed. The fluids that are thus circulated in the sealed space and collected by the duct 23 kept at negative pressure can include:

- solvents or primers intended to prepare the facing surfaces of the substrate 1 and the plate 2 as well as the inner side of the permanent seal 3 to facilitate the adherence of the adhesive that will be injected subsequently. The appropriate solvents or primers will generally be indicated by the supplier of the adhesive used;
- dry air at a controlled temperature, intended to produce the desired temperature and humidity conditions in the sealed space.

When the desired conditions have been produced in the sealed space, the injection of the liquid adhesive 15, containing short reinforcing fibres if applicable, can begin. In the example shown in FIG. 6, injection is carried out by placing the duct 27 in a tank 30 of liquid adhesive 15 and opening the valve 28, the valve 26 being closed. The liquid adhesive 15 propagates in the sealed space. Once the space is completely full (FIG. 7), the liquid adhesive comes out of the duct 23. It can be detected in the duct 23 or in a buffer tank 31 of the pumping system 22. Following such detection, the valve 28 is closed and then the ducts 23, 24 are closed off on the back of the plate 2, at the points marked 33, 34 in FIG. 7.

The closed sealed space is then completely occupied by liquid adhesive 15. The resin constituting the adhesive 15 is polymerised, holding it for the period specified by the resin supplier. It may be appropriate to heat the plate to speed up cross-linking. Such heating can be performed by contact on the back of the plate 2, it being observed that cross-linking temperatures, which are typically several tens of degrees, are much lower than those reached during the implementation of a welding method.

Figure 8:
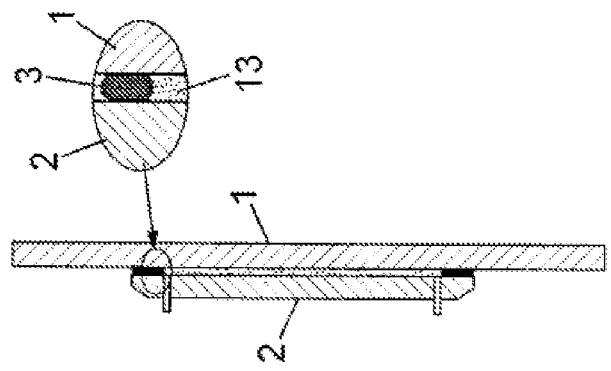
Figure 7:
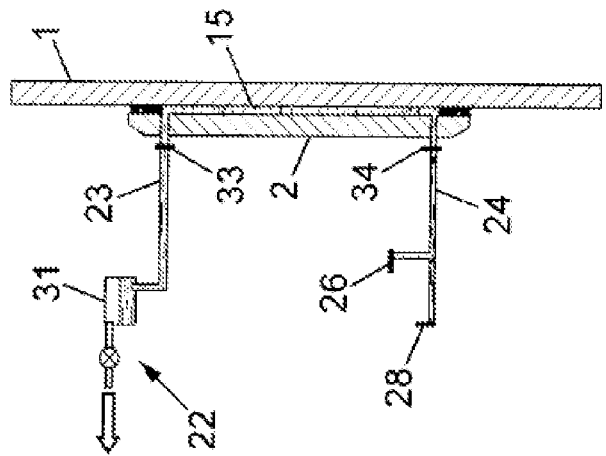
Figure 6:
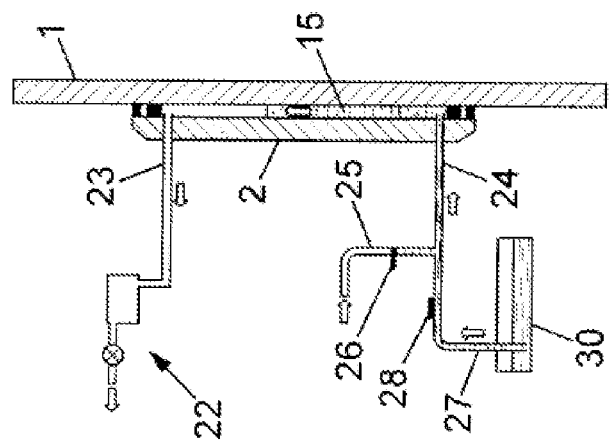

Once polymerised, the adhesive 13 holds the permanent seal 3 by adhesion and by the compression, generated during installation, between the substrate 1 and the rigid element 2 (FIG. 8).

The adhesive assembly can be used temporarily if this is appropriate to the application. It can be removed by cutting the adhesive 13 and the seals 3, 4 with an abrasive wire. An example of use of a temporary adhesive assembly is in the temporary assembly of an installation guide for a module on an offshore oil platform.

The shape of the rigid element 2 can be adjusted to fit the shape of the substrate 1. The adhesive assembly can in particular be installed in a corner of a structure or on curved surfaces. The shape of the rigid element 2 can also be adjusted to optimise its contribution to the structural reinforcement of the substrate 1.

Another application of an adhesive assembly according to the invention is reinforcing a structure, either preventatively, if the structure has to withstand greater loads than initially planned, or to repair a cracked, corroded or perforated area.

For structural reinforcement, the rigid element 2 and the adhesive 13 can be put in place in the same way as described with reference to FIGS. 2 to 8. Generally, reinforcing elements will be coated by the adhesive between the substrate 1 and the rigid element 2 to increase the mechanical strength properties.

The reinforcing elements will preferably be fibres. As in the previous example, these can be short fibres, the quantity of which will be calculated in accordance with the forces to be withstood by the system bonded to the substrate 1. They can also be longer fibres belonging to a mat or fabric placed in the interval when the rigid element 2 is being placed.

The long fibres are arranged depending on the repair or reinforcement to be made. For example, if a substrate 1 with a crack 40 (FIG. 9) is to be repaired, quite a large proportion of the fibres will be arranged transversally to the direction of the crack.

In the example shown in FIG. 9, the reinforcing fibres belong to a prepreg 50 arranged between the substrate 1 and the rigid element 2 during the production of the assembly. The prepreg 50, which is refrigerated before positioning to delay the cross-linking of the resin that it incorporates, can, in a manner known per se, consist of a stack of layers including for example:

- an adhesive film 51 on the side of the substrate 1;
- the actual pre-impregnated mat 52, that is, the assembly of fibres impregnated with a resin, the setting of which is delayed by cold;
- a fibre filling 55 that is capable of being flooded by the resin when the prepreg is compressed;
- an adhesive film 56 on the side of the rigid element 2.

It will be understood that a wide variety of arrangements of the prepreg, other than the one shown in FIG. 9, can be used within the scope of the present invention. For example, the prepreg can also comprise a heater blanket to heat the resin 15 when this is necessary to ensure cross-linking, and an intermediate film. These additional elements can then be arranged in such a way as to maintain continuity of the adhesive between the substrate 1 and the rigid element 2.

For the installation of the adhesive assembly shown in FIG. 9, the negative pressure is achieved, by the duct 23, in the space defined by the permanent seal 3 and the installation seal 4. As previously, dry air is circulated in the sealed space in order to control the humidity conditions and temperature. It is possible to increase the negative pressure via the duct 23 by pressing on the rigid element 2 to compress the prepreg. When the resin from the prepreg flows back out of the duct 23, the duct is closed and the resin is cross-linked in the sealed space, if necessary by heating it. If the resin from the prepreg is not sufficient to fill the space after the rigid plate 2 has been forced towards the substrate 1, it is possible to inject further resin as set out with reference to FIGS. 6 and 7.

FIG. 9 shows a permanent seal 3 and an installation seal 4 with different shapes from those shown in FIGS. 1 to 8. The permanent seal 3 has an M-shaped profile, one side of which is bonded to the rigid plate 2 and the other side of which is applied against the substrate 1. The installation seal 4 is a flexible sheet bonded to the central part of the M-shaped profile of the permanent seal 3 and applied against the substrate 1 around the rigid plate 2 by means of a bead of sealant 5. If necessary, shims in the form of wedges can be inserted in the triangular groove made around the periphery of the M-shaped seal 3 in order to control the thickness of the interval between the substrate 1 and the rigid plate 2 during implementation. Controlling the thickness of the interval between the substrate 1 and the rigid plate 2 also makes it possible to improve management of the geometry and thus the behaviour of the composite reinforcement. In the case shown in FIG. 1, the permanent seal 3 has a trapezoid profile while the installation seal 4 is in the form of a bellows. In the cases shown in FIGS. 2 to 8, the permanent seal 3 has a round profile and the installation seal 4 is in the form of a skirt surrounding the permanent seal 3. Generally, it will be understood that the permanent seal 3 and, when it is present, the installation seal 4, can have a wide variety of shapes within the scope of the invention.

The applications of the adhesive assembly according to the invention are very varied. They include for example:
- connections for supporting a new element on a marine or maritime installation, particularly oil-related;
- connections for supporting a new element to be placed underwater, for example on or under the hull of an FPSO (Floating Production, Storage and Offloading) platform or in the tidal zone or in compartments such as ballasts;
- temporary connections for installation guides on an offshore facility, where epoxy, polyurethane, polyester, vinylester, methacrylate, silicon and polyimide type adhesives are used for their known qualities in terms of resilience and strength;
- structural reinforcements (beams: chords and webs, columns, struts, sheet metal, etc.);
- repairs to a damaged structural area, for example corrosion;
- repairs to a perforated structural area where the seal must be reconstituted. The rigid elements to be bonded can be placed on both sides of the substrate area to be treated;
- repairs to a cracked area;
- repairs to a pipeline, including underwater, in order to restore its sealing or strength;
- repair, reinforcement or connection in civil engineering structures, industrial production facilities, etc.
- repair, reinforcement or connection on ships, aircraft, etc.

The invention claimed is:

1. An adhesive assembly comprising:
   a substrate;
   a rigid element arranged with an interval relative to the substrate;
   at least one seal compressed between the substrate and the rigid element and defining a closed off space within said interval; and
   a hardened adhesive comprised of a material which is different than the material of the seal, said hardened adhesive occupying said closed off space, the seal being compressed by the rigid element that is held on the substrate by the hardened adhesive.

2. The adhesive assembly according to claim 1, wherein an adherent interface is formed between the hardened adhesive and the compressed seal.

3. The adhesive assembly according to claim 1, wherein fillers are coated by the hardened adhesive within said closed off space.

4. The adhesive assembly according to claim 1, comprising at least one sensor located in the interval between the rigid element and the substrate, to detect at least one physical parameter within said interval.

5. The adhesive assembly according to claim 4, wherein the sensor comprises a humidity sensor, the assembly also comprising a hydrophilic element located at the seal and in contact with the humidity sensor.

6. A method of assembling a rigid element to a substrate, the method comprising the following steps:
   /a/ placing the rigid element relative to the substrate, at least one permanent seal being arranged between the rigid element and the substrate in such a way as to define a closed off space in an interval between the rigid element and the substrate;
   /b/ bringing the rigid element and the substrate together in such a way as to compress the permanent seal and seal said closed off space; and
   /c/ introducing and hardening an adhesive comprised of a material which is different than the material of the seal in the closed off space.

7. A method of reinforcing a structure comprising at least one substrate, the method comprising the following steps:
   /a/ placing a rigid element opposite the substrate, at least one permanent seal being arranged between the rigid element and the substrate in such a way as to define a closed off space in an interval between the rigid element and the substrate;
   /b/ bringing the rigid element and the substrate together in such a way as to compress the permanent seal and seal said closed off space; and
   /c/ introducing and hardening an adhesive comprised of a material which is different than the material of the seal in the closed off space to form a composite reinforcement that is isolated from the outside by the permanent seal, which is kept compressed by the rigid element.

8. The method according to claim 6 comprising a prior step of surface treatment of the substrate by at least one of abrasion and application of solvents.

9. The method according to claim 6, wherein the bringing of the rigid element towards the substrate comprises the creation of negative pressure in the closed off space defined in the interval between the rigid element and the substrate.

10. The method according to claim 9, wherein an installation seal more flexible than the permanent seal is arranged between the rigid element and the substrate near the permanent seal.

11. The method according to claim 6, wherein the bringing of the rigid element towards the substrate comprises the application of force on the rigid element towards the substrate.

12. The method according to claim 6, further comprising circulating in the closed off space, between steps /b/ and /c/, at least one of the following: a dry gas, at least one solvent, and at least one primer.

13. The method according to claim 6, wherein the adhesive is injected in the liquid state into the closed off space before hardening.

14. The method according to claim 13, wherein short reinforcing fibres are dispersed in the liquid adhesive injected.

15. The method according to claim 6, wherein at least part of the adhesive is part of a prepreg arranged in the interval between the rigid element and the substrate.

16. The method according to claim 15, wherein the rigid element is brought towards the substrate at least until the adhesive from the prepreg is discharged through a duct provided in the rigid element.

17. The method according to claim 7, comprising a prior step of surface treatment of the substrate by at least one of abrasion and application of solvents.

18. The method according to claim 7, wherein the bringing of the rigid element towards the substrate comprises the creation of negative pressure in the closed off space defined in the interval between the rigid element and the substrate.

19. The method according to claim 7, wherein the bringing of the rigid element towards the substrate comprises the application of force on the rigid element towards the substrate.

20. The method according to claim 7, further comprising circulating in the closed off space, between steps /b/ and /c/, at least one of the following: a dry gas, at least one solvent, and at least one primer.

21. The method according to claim 7, wherein the adhesive is injected in the liquid state into the closed off space before hardening.

22. The method according to claim 7, wherein at least part of the adhesive is part of a prepreg arranged in the interval between the rigid element and the substrate.

* * * * *